Figure 1:
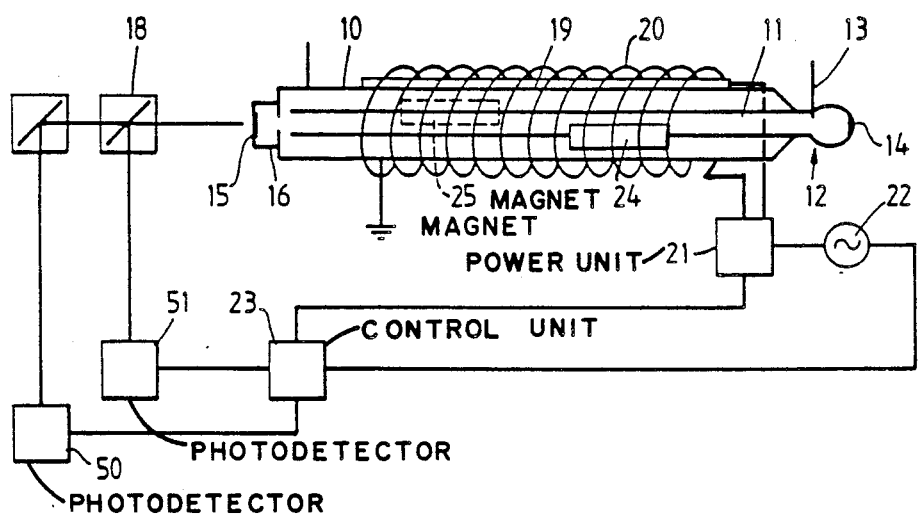

United States Patent [19]

Rowley et al.

[11] Patent Number: 4,987,574

[45] Date of Patent: Jan. 22, 1991

[54] HELIUM-NEON LASERS

[75] Inventors: William R. C. Rowley, Twickenham; Patrick Gill, Chiddingford, both of Great Britain

[73] Assignee: The Secretary of State for Trade and Industry in Her Britannic Majesty's Government of the United Kingdom of Great Britain and Northern Ireland, London, England

[21] Appl. No.: 435,394

[22] PCT Filed: May 5, 1988

[86] PCT No.: PCT/GB88/00352

§ 371 Date: Nov. 3, 1989

§ 102(e) Date: Nov. 3, 1989

[87] PCT Pub. No.: WO88/09072

PCT Pub. Date: Nov. 17, 1988

[30] Foreign Application Priority Data

May 8, 1987 [GB] United Kingdom ............... 8710884

[51] Int. Cl.[5] .............................................. H01S 3/10
[52] U.S. Cl. .......................................... 372/28; 372/37; 372/34; 372/32; 372/27
[58] Field of Search ................... 372/32, 29, 33, 34, 372/26, 27, 37

[56] References Cited

U.S. PATENT DOCUMENTS

| 3,649,930 | 3/1972 | Floch | 331/94.5 |
|---|---|---|---|
| 3,831,108 | 8/1974 | LeFloch | 372/37 |
| 3,889,207 | 6/1975 | Burgwald | 372/37 |
| 4,010,363 | 3/1977 | Hernqvist | 250/201 |
| 4,387,462 | 6/1983 | Markus | 372/32 |
| 4,397,025 | 8/1983 | Kebabian | 372/29 |
| 4,398,293 | 8/1983 | Hall et al. | 372/32 |
| 4,672,618 | 6/1987 | Wuntoes | 372/32 |
| 4,823,348 | 4/1989 | Hercher | 372/34 |

FOREIGN PATENT DOCUMENTS 2070978 9/1971 France .

OTHER PUBLICATIONS

Optics Communications, vol. 55, No. 5, Oct. 1985, Elsevier Science Pub. B.V. (Amsterdam, NL), K. Seta et al., "Frequency Stabilization of A HeNe (cont.) laser Using a Thin Film Heater Coated on the Laser Tube", pp. 367-369.

Primary Examiner—Leon Scott, Jr.
Attorney, Agent, or Firm—Nixon & Vanderhye

[57] ABSTRACT

A stabilized helium-neon laser emits radiation in the ranges of ultra-violet, infra-red and visible other than red in at least two modes. A stabilizing system consists of an alignment heater (19) which bends the laser tubes toward optimum alignment, a coil heater (20) which cyclically varies the tube length and permanent magnets (24,25) which reduce instability of mode polarizations and to optimize relative intensities of the modes. The transmitted output is stabilized in frequency by control of the laser tube length, with the stabilization signal derived from the steady or varying intensity of intensities of one or both of two orthogonally polarized optical outputs. There are many potential uses for non-red helium-neon lasers in applications where non-red light is required, for example, in multi-wavelength interferometry.

9 Claims, 1 Drawing Sheet

HELIUM-NEON LASERS

The present invention relates particularly to helium-neon lasers of the type emitting colors other than red.

Lasers have been known for many years and have many uses. The gain medium may be gaseous, and one of the most commonly used gas lasers is the helium-neon laser which commonly emits a red light.

In the simplest form of helium-neon laser the frequency of the emitted light changes as the laser tube heats up. This is because the frequency emitted is dependent on the length of the laser tube which expands as it heats. In addition, most lasers emit light in more than one mode so that the output is not a pure single frequency, but is composed of two or more optical frequencies (cavity modes).

Many uses of a laser require the emitted light to be of a known and constant single frequency. Consequently many helium-neon lasers use a frequency stabilisation system. One such system controls the length of the laser such that the frequencies of its two emitted modes are on either side of the centre frequency of the neon transition. These two modes are typically in orthogonal polarisation states. The intensities of these modes are compared to provide a correction signal. If the modes change frequency, the correction signal also changes and may be used in a feedback circuit so as to prevent or reduce such frequency changes. The correction signal is applied by means such as a heater or a piezo-electric element, that can alter the length of the laser.

The heater may take many different forms, such as heater wires, thermofoils or a thin film heater coated on the laser tube, the last being described in an article by K. Seta and S. Iwasaki entitled 'Frequency Stabilisation of the He-Ne Laser using a thin film heater coated on the laser tube', Optics Communications, Volume 55, No. 5, October 1985, Elsevier Science Publishers B V (Amsterdam, NL).

Another problem that occurs with lasers operating at high temperatures is that the tube bends and becomes misaligned. A laser alignment system is described in U.S. Pat. No. 4,010,363 which describes a rather complicated system comprising a plurality of heaters along the tube. By use of control circuits, selective portions of the tube are heated if the laser becomes misaligned. The system is complex and requires positional misalignment data collection and feedback signals.

Another form of stabilisation system, which is applicable particularly to a laser that emits in only one mode, makes use of the Zeeman effect. A magnetic field is applied so that the mode is split into two orthogonally polarised components. In the stabilisation system, these components are controlled to be on either side of the neon frequency. The correction signal may be derived either from the relative intensities of the two components, or from their frequency separation.

Such a stabilisation system is described in U.S. Pat. No. 3,649,930 where the Zeeman effect is used in conjunction with the Doppler effect in a stabilisation system for frequency stabilisation of a single-mode gas laser.

It has recently been found possible to manufacture helium-neon lasers which emit light of a color other than red. This can only be done by very careful control of the helium to neon gas mix ratio and of the mirror reflectivities. There are many potential uses for non-red helium-neon lasers in applications where non-red light is required. For example a non-red helium-neon laser can be used in conjunction with a red helium-neon laser in multi-wavelength interferometry.

However in multi-wavelength interferometry, and in some other areas where non-red helium-neon lasers might be used, it is important that the emitted frequency be stable. Unfortunately it has been found that the system which are so effective in stabilising red helium-neon lasers are not directly applicable to non-red lasers. Reasons include laser emission in more than two cavity modes (frequencies), the tendency of such modes to change their polarisation states when the laser length changes very slightly, and the extreme sensitivity of the laser to misalignment by bending as a result of thermal disturbances.

There is therefore a need for an improved frequency stabilisation system suitable for non-red helium-neon lasers.

According to one aspect of the present invention a helium-neon laser of the type emitting radiation of the ranges of ultra-violet, infra-red and visible, other than red, light, the laser tube emitting the radiation in at least two modes, characterised in having a stabilising system including, in combination;

a heating system adapted to supply heat substantially uniformly along the length of the laser tube in order to bend the laser tube towards an optimum alignment;

a magnetic field so adjusted as to reduce instability of mode polarisations and to optimise relative intensities of the modes; means of frequency modulation by cyclically varying the tube length; and means providing active frequency stabilisation by means of control of the tube length, with a stabilisation signal derived from the steady or varying intensity or intensities of one or both of two orthogonally polarised optical outputs.

The alignment heating system may embody a strip heating element extending along the length of the laser tube, or may utilise a metal strip or bar that is separately heated.

The tube length may be cyclically varied by piezo-electric means, by magnetic means, or by thermal means, the thermal means preferably being effected by superimposing a varying electric current on an electric supply to the heating system.

The frequency stabilisation signal may be derived either from a balance between the intensities of the orthogonal polarisations, or from a variation of intensity resulting from an imposed modulation of the laser length, or from a sequential or simultaneous application of both these techniques.

According to another aspect of the invention there is provided a method of frequency stabilisation of a helium-neon laser of the type emitting radiation in the ranges of ultra-violet, infra-red and visible, other than red, light, the laser tube emitting the radiation in at least two modes, characterised in that it comprises the steps of:

adapting a heating system to supply heat substantially uniformly along the length of the laser tube in order to bend the laser tube towards optimum alignment;

applying a magnetic field and adjusting it so as to reduce instability of polarisations and to optimise relative intensities of the modes;

cyclically varying the tube length for frequency modulation; stabilising the output frequency of the laser by means of control of the tube length with a stabilisation signal derived from the steady or varying intensity of one or both of two orthogonally polarised optical outputs.

Figure 2:
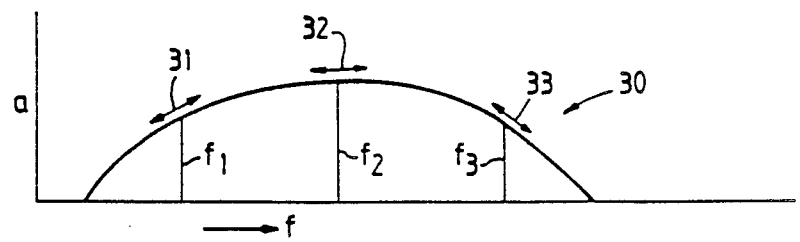

One embodiment of the invention will now be described, by way of example only, with reference to the accompanying diagramatic drawings, of which:

FIG. 1 shows a laser according to the invention, and FIG. 2 shows the emission pattern of the laser illustrated in FIG. 1.

A laser (FIG. 1) has a metal or glass outer tube 10 and an inner capillary 11 at one end 12 of which is an anode 13. An electrical discharge takes place between the anode 13 and the cathode, which may be the metal tube 10 or a separate metal tube within the tube 10. Partially transmitting mirrors 14 and 15 are situated at the ends of the capillary. Light emerging from mirror 15 passes through a polarisation-rotating element and beam-splitter 18 such that only one plane of polarisation is transmitted, and some of this transmitted light is partially reflected to a first photodetector 50. Light in the orthogonal polarisation is reflected to a second photodetector 51. Electrical signals from both detectors pass separately to a control unit 23.

Permanent magnets 24 and (dotted line) 25 are situated adjacent to the tube 10.

An alignment heater 19 extends over a substantial part of the length of the tube 10. Tube 10 is surrounded by a coiled heating strip 20 or foil heater, which may conveniently be in two parts so that one part may be used for cyclic heating (modulation) and the other part for length control. Power for the heaters comes from a unit 21, which has inputs from the control unit 23 and an oscillator 22.

The tube contains a helium-neon gas mixture and operates in known fashion as a laser when a discharge takes place through the capillary 11 by means of the anode and cathode electrodes. The emitted light consists typically of three substantially single frequencies (modes) f1, f2, f3, (31, 32, 33) within a broad envelope 30 of the neon emission spectrum. These frequencies are inversely proportional to the length between the mirrors 14 and 15 of the laser. As the tube heats up, the frequencies decrease. At any time each one of the three frequency outputs will be in one of two orthogonal polarisation states. When the laser length changes not only do the frequencies change, but so also do the polarisation states.

The laser is required to provide a stable output, so that one of the frequencies f1, f2, f3 is in a reproducible polarisation state, and the other two frequencies are in the orthogonal polarisation state. Thus only one frequency is transmitted by the polarising optics 18. Furthermore, the transmitted output is stabilised in frequency by control of the laser length in a particular manner detailed in this invention.

The permanent magnets 24, 25 are empirically positioned adjacent to the tube 10 such that the laser outputs change polarisation much less frequently than would otherwise be the case, and such that the tuning envelope 30 has steeper flanks than otherwise. Thus the intensities of outputs 31, 33 change more steeply of their frequencies are made to change (e.g. by altering the tube temperature).

The tube 10 is mounted with the capillary 11 approximately horizontal and, while operating as a laser, its position is adjusted by rotation about this axis in order to maximise the output power. The power changes because the temperature of the tube is greatest at the top and this affects the optical alignment of the mirrors 14, 15 by differential thermal expansion of the tube 10. The alignment is then optimised by mounting the alignment heater 19 either along the top or bottom of the tube 10, depending on whether more or less differential heating is required to improve the alignment. Therefore, the tube is asymetrically heated (with respect to its circumference) by heater 19, thus bending the tube due to differential expansion.

The polarisation - rotating component incorporated in unit 18 is adjusted so that the emitted polarisations are horizontal and vertical planes, and part of the light of each polarisation is directed onto the separate respective photodetectors 50, 51. Thus, for example, if output 31 is in one state of polarisation and outputs 32 and 33 are in the other state (see FIG. 2), then a small increase in frequency would cause output 31 to increase in power and the sum of outputs 32 and 33 to decrease. This differential power change is the basis of one type of control signal from unit 23 that operates unit 21.

A second control signal results from the cyclic heating of part or all of the length of the laser tube 10 by adjusting the heater 20 by means of the oscillator 22 and power unit 21. The cyclic heating gives rise to a corresponding cyclic length change and cyclic frequency change of the outputs. These cyclic frequency changes give rise to corresponding intensity changes at the photodetectors. The signal from either of the photodetectors 50, 51 may be utilised, or a differential signal from both. The resulting electrical signal can be selectively amplified and synchronously detected with a phase sensitive rectification system in the control unit 23, by means of a reference signal from the oscillator 22. The output from the phase sensitive rectifier changes if the frequencies of FIG. 2 change, corresponding to the gradients of the tuning envelope 30. The phase sensitive rectifier output may be compared with a fixed reference voltage or with one derived from the direct output of the photodetector, so that any frequency changes give rise to a correction signal from unit 23.

In some applications of the invention the control signal based on the differential power change will be convenient. This will be the case particularly when cyclic changes of the optical frequency are undesirable. In other applications, the control signal based on cyclic length changes will be more satisfactory. In many cases, however, it will be advantageous to use a combination of both control signals. In one example of a combination method, the laser may be initially stabilised by the differential power change signal so as to cause the output frequency to approximate to a suitable value such that the cyclic type of control signal can subsequently be used. This type of dual control serves to reduce the possibility of the laser being stabilised at an undesired frequency at which one or other of the control signals may have an ambiguous value.

In another combination method, either one of the differential or cyclic control signals may be used for stabilisation, with the other control signal being used to discriminate against stabilisation at undesired frequencies. Another example of a combination method is to stabilise the laser primarily to the differential control signal, but to modify the value of the differential power balance by reference to the cyclic control signal. It would be particularly advantageous in this case to use the integral of the cyclic control signal to modify the differential power balance signal. Such a technique improves the long term stability of the system.

It will be realised that there are many variations, within the scope of the invention, of the stabilisation system described above. For example, foil heaters, coils or strip heaters may be used for the alignment and length adjusting heaters. Also, for convenience, laser length variation by means of heat supply variation has been described. In many cases it will be more convenient to use other means of length variation, or a combination of several different means. In particular piezoelectric elements, or magnetostrictive action on the mountings of one or both of the mirrors 14, 15 are especially convenient.

It will also be realised that the term light used in the specification is intended to cover radiation in the ultra-violet, infra-red and visible regions of the electromagnetic spectrum.

What is claimed is:

1. In a helium-neon laser of the type emitting radiation in the ranges of ultra-violet, infra-red and visible, other than red light, said laser having a laser tube with a length and circumference, the laser tube emitting the radiation in at least two modes, a stabilising system including, in combination:
   a heating system means for supplying heat substantially uniformly along the length of the laser tube and asymetrically around the circumference of the laser tube, for bending the laser tube towards an optimum alignment;
   a permanent magnetic field means for reducing instability of mode polarisations and to optimise relative intensities of the modes;
   means for frequency modulation by cyclically varying the tube length; and
   means providing active frequency stabilisation by control of the tube length, with a stabilisation signal derived from at least one of a steady, varying intensity, and intensities of at least two orthogonally polarised optical outputs.

2. A helium-neon laser as claimed in claim 1 characterised in that the tube length is cyclically varied by piezo-electric means.

3. A helium-neon laser as claimed in claim 1 characterised in that the tube length is cyclically varied by magnetic means.

4. A helium-neon laser as claimed in claim 1 characterised in that the tube length is cyclically varied by thermal means.

5. A helium-neon laser as claimed in claim 4 characterised in that the thermal means is effected by varying electric current in an electric supply to the heating system.

6. A helium-neon laser as claimed in claim 1 characterised in that the heating system includes a strip heating element extending along the length of the laser tube.

7. A helium-neon laser as claimed in claim 1 characterised in that the heating system includes a separately heated metal bar.

8. A helium-neon laser as claimed in claim 1 characterised in that the stabilisation signal is derived from a balance between the intensities of the orthogonal polarisations.

9. A helium-neon laser as claimed in claim 1 characterised in that the stabilisation signal is derived from a variation in intensity resulting from an imposed modulation of the laser tube length.

* * * * *